2,907,016
SHORT CIRCUIT AND GROUNDING INDICATOR FOR FLAME DETECTOR SYSTEMS

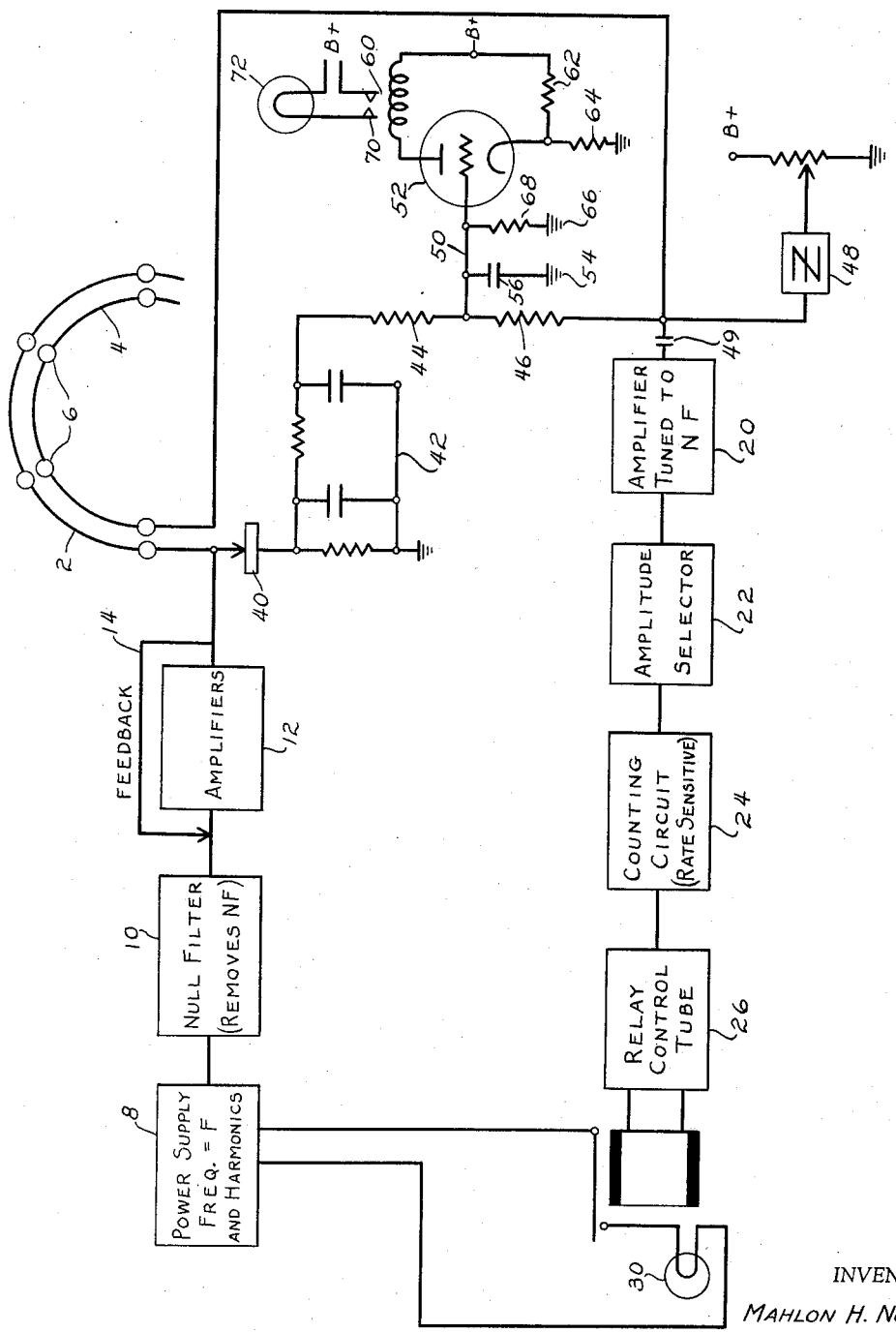

Mahlon H. Norton, Paterson, N.J., assignor to Petcar Research Corporation, Belleville, N.J., a corporation of New Jersey Continuation of application Serial No. 362,059, June 16, 1953. This application July 23, 1953, Serial No. 369,773

1 Claim. (Cl. 340—255)

This application is a continuation of my co-pending application Serial No. 362,059, filed June 16, 1953.

This invention relates to flame-detection systems of the type in which a signal is produced when two electrodes forming part of the system are bridged by a flame. Such a system is disclosed in my co-pending application Serial No. 369,917 and the present invention is particularly designed and intended for use with that system although it may be used with, or form part of, any detection system including two or more electrodes which are bridged by a flame to produce the signal indication.

The flame-detecting system provided by the invention of my co-pending application comprises two spaced electrodes which are positioned in closely spaced relation within the space which is to be monitored. A source of alternating voltage is associated with one wire, which is known and referred to hereinafter as the transmitting wire, and supplies to this wire an alternating frequency from which one harmonic of the frequency produced by the source is eliminated, it being understood that in the embodiment of the invention disclosed in my co-pending application the harmonic which is attenuated is an harmonic which is neither the zero harmonic nor the basic frequency itself. The second wire, which is known and referred to hereinafter as the receiving wire, is connected to receiving means which is tuned to receive only that harmonic of the frequency produced by the source which is not present in the voltage supplied to the transmitting wire. In the absence of a flame bridging the two wires, the energy supplied to the transmitting wire normally is not received by the receiving means connected to the receiving wire because of the selective tuning thereof. However, a flame bridging the two wires causes immediate generation of the missing harmonic frequency in the output circuit of the receiving wire, thus developing energy which may be utilized to energize indicating means. It will be understood that more than one transmitting electrode and more than one receiving electrode may be used and that more than one harmonic of the basic frequency may be suppressed, and that if more than one harmonic is suppressed the receiving means may be tuned to receive one or more of the suppressed harmonics.

It has been found that grounding of either the transmitting or receiving wire of such a system, or the short-circuiting of them by contact between the two, will render the entire system inoperative until the grounding or short-circuiting is removed. It is therefore necessary to know that such grounding or short-circuiting has occurred, and it has been the principal object of this invention to provide means for association with such a flame-detecting system for providing an indication that one or both wires have been grounded or that the two wires have contacted each other.

This principal object, as well as others, has been achieved by the present invention, one embodiment of which is described in the following specification and illustrated in the accompanying drawing which is partly a schematic diagram and partly a circuit diagram of a flame detection system having associated with it the means provided by the present invention.

A schematic diagram of a flame detecting system constructed and operable in accordance with this invention is disclosed in the drawing and comprises a transmitting electrode 2 and a receiving electrode 4 which, in the disclosed embodiment take the form of elongated, bare wires which are mounted in closely spaced relation on insulator supports 6 and are trained through the space to be monitored, which may be the engine zone of an aircraft engine nacelle. A source of alternating voltage 8 is connected to the transmitting wire 2 through a null filter 10 which eliminates from the energy supplied to the wire 2 one harmonic of the frequency generated by the source, and an amplifier 12, thus causing a voltage to be developed between wire 2 and ground having all of the basic and harmonic frequencies produced by source 8 but with a negligible amount of the harmonic attenuated by filter 10. The receiving wire 4 is connected through amplifier 20, amplitude selector 22, counting rate circuit 24 and relay control tube 26 to a relay 28 which is operable, when energized, to close the circuit through an indicating device such as lamp 30.

Means are provided by the present invention which are operative to provide a warning indication upon grounding of either the transmitting wire or the receiving wire or short-circuiting of the two wires by contact between them. Such means comprise a rectifier 40 which is connected to the transmitting wire 2 and the output of which is connected to the input of a filter circuit 42 of conventional design which supplies direct current at voltage E1 to a resistor 44. A second resistor 46 is connected between resistor 44 and the receiving wire and is supplied with direct current at voltage E2 from the local B+ source through an impedance 48 which is high at the attenuated frequency nF and low at direct current. A condenser 49 is connected between the tuned amplifier 20 and the connection of impedance 48 to the receiving wire 4 to block direct current in the receiving wire from the tuned amplifier and succeeding circuit elements. The junction between resistors 44 and 46 is connected through lead 50 to the grid of vacuum tube 52. The lead 50 is grounded at 54 through capacitance 56 which prevents transmitted energy, distorted by rectifier 40, from entering the receiver to a harmful degree. The plate of tube 52 is connected to the winding 58 of relay 60 which, in turn, is connected to the local B+ source. The grid of the tube is grounded at 66 through resistance 68. The cathode of the tube 52 is biased positive with respect to ground by connection to the dropping network comprised of resistors 62 and 64 which are energized by the local B+ source. The contacts 70 of relay 60 are in circuit with an indicating device, such as lamp 72 and a source of power such as the local low voltage A.C. source.

In the use and operation of the described system the transmitting wire 2 is constantly supplied with alternating voltage by source 8 and the top of resistor 44 constantly has a direct current potential drop E1 to ground. The resistor 46 is constantly supplied with direct current and has a potential drop E2 to ground which is approximately equal to that at resistor 44. These two voltages add in the grid of tube 52 across resistor 68 and the tube therefore normally draws current through the relay 60, energizing the winding 58 and maintaining the relay contacts 70 open, thus de-energizing the indicator lamp 72. If the transmitter wire 2 is grounded the rectifier 40 and filter circuit 42 will have no alternating voltage to rectify and voltage E1 will not appear at resistor 44. Similarly, if the receiver wire 4 is grounded the direct current normally supplied through that wire to resistor 46 will flow to ground and direct current voltage E2 will not appear at resistor 46. If the transmitting and receiving wires 4, 6 contact each other the direct current on the receiving wire is grounded out by the low direct current impedance to ground presented by the transmitter wire and associated circuitry and direct current voltage E2 will not appear at resistor 46. In any one of these three cases the grid voltage of tube 52 will be reduced and the tube will draw reduced current, thus de-energizing the relay winding 58 and causing the relay contacts 60 to come together, thus completing the circuit through the indicator lamp 72 and the source of power 74.

While I have described and illustrated one form which my invention may take, it will be apparent to those skilled in the art to which it relates that other embodiments, as well as modifications of that disclosed, may be made and practised without departing in any way from the spirit or scope of the invention, for the limits of which reference must be had to the appended claim.

What is claimed is:

An electrical flame detecting system comprising two spaced electrodes positioned within a space to be monitored and insulated from each other and from ground and adapted to be bridged by a flame, means for developing between one electrode and ground an alternating voltage of a known fundamental frequency from which at least one harmonic has been attenuated to negligible value, which is neither the zero nor first harmonic of the fundamental frequency, receiving means connected between the second electrode and ground which is responsive only to the attenuated harmonic or harmonics of the fundamental frequency, means for indicating reception of said attenuated harmonic, means for rectifying energy from said first electrode, means for supplying direct current to said second electrode, means for combining the rectified current from the first electrode with the direct current supplied to the second electrode, a second indicating means, control means for the second indicating means responsive to the combined currents and normally operable by the combined currents to maintain said indicating means inoperative but operable upon reduction of said combined currents by grounding of either of said electrodes or short-circuiting between them to operate said indicating means.

References Cited in the file of this patent

UNITED STATES PATENTS

| | | |
|---|---|---|
| 1,229,939 | Goldstein | June 12, 1917 |
| 2,022,758 | Corderman | Dec. 3, 1935 |
| 2,390,778 | Cook | Dec. 11, 1945 |
| 2,709,799 | Norton | May 31, 1955 |

FOREIGN PATENTS

| | | |
|---|---|---|
| 289,538 | Great Britain | Apr. 30, 1928 |

OTHER REFERENCES

"Check That Ground," in Allis Chalmers Electrical Review, Second Quarter, 1948.